Mar. 13, 1923.
J. F. O'CONNOR.
FRICTION SHOCK ABSORBING MECHANISM.
FILED APR. 6, 1921.
1,448,495.
3 SHEETS—SHEET 1.
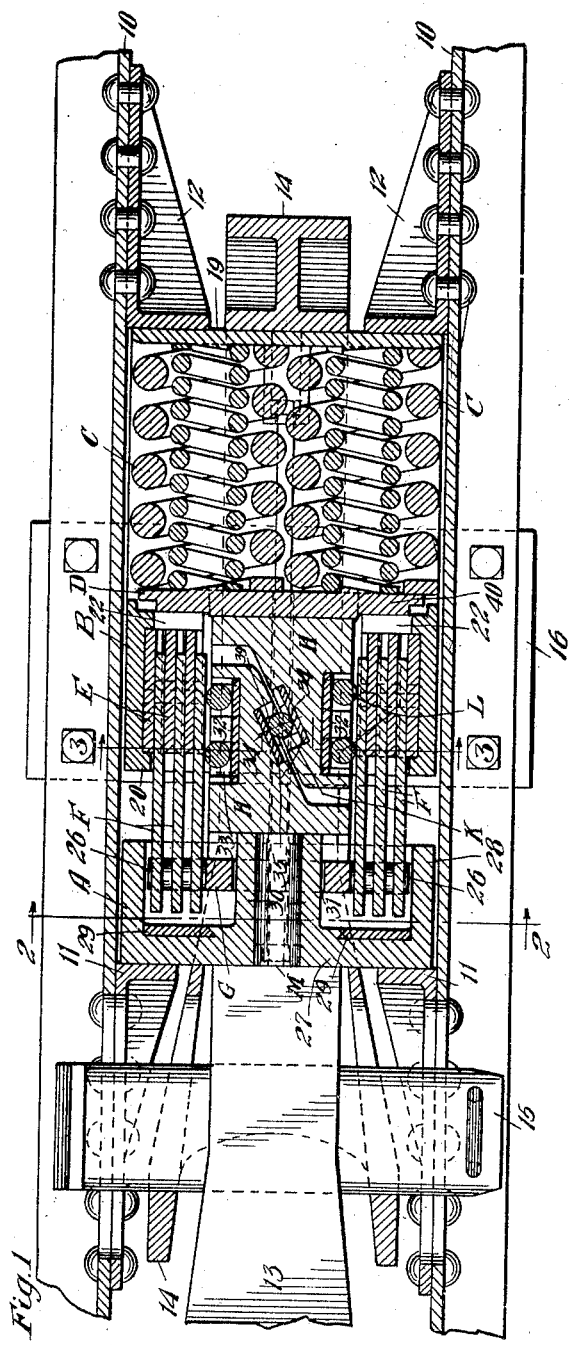
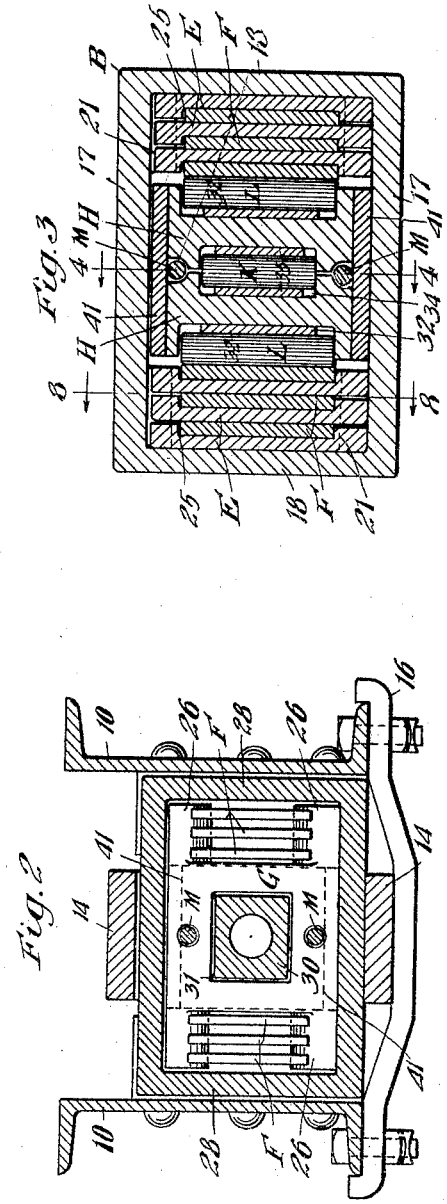
Witnesses
Wm. Geiger
Inventor
John F. O'Connor
By Geo. I. Haight
His Atty

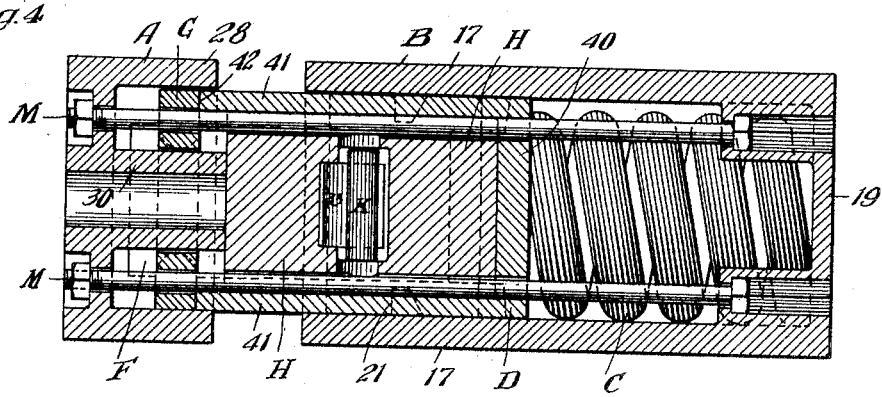
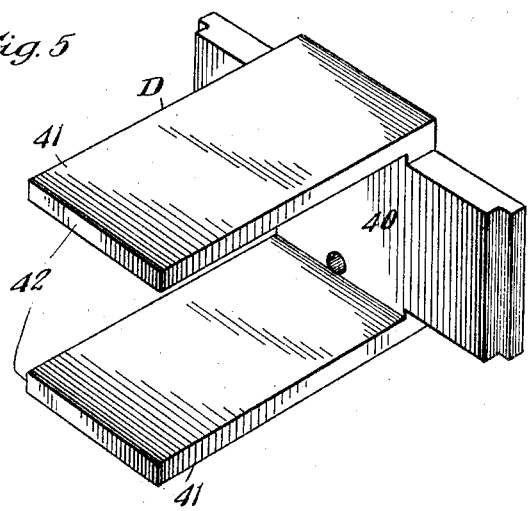
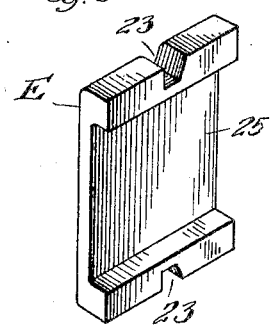
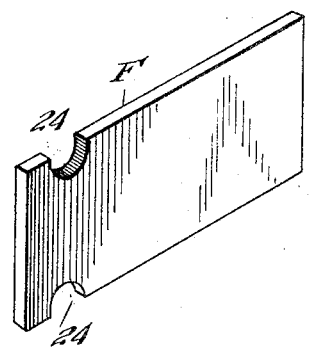

Mar. 13, 1923.

J. F. O'CONNOR.
FRICTION SHOCK ABSORBING MECHANISM.
FILED APR. 6, 1921.

1,448,495.

3 SHEETS—SHEET 3.

Witnesses
Wm. Geiger

Inventor
John F. O'Connor
By Geo. I. Haight
His Atty.

Patented Mar. 13, 1923.

1,448,495

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

Application filed April 6, 1921. Serial No. 459,069.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism especially adapted for railway draft riggings and wherein are obtained high capacity combined with certain release, and long life of the wearing parts.

Another object of the invention is to provide in a mechanism of the character above indicated having included therein friction elements, a wedging system and a spring resistance, an arrangement whereby is obtained, during the compression stroke, a short preliminary spring action accompanied by a simultaneous positive setting up of the wedge action or pressure on the friction elements followed, during the remainder of the compression stroke, by a combined friction and spring resistance proportional to the load.

Another object of the invention is the provision of a mechanism characterized as indicated in the preceding paragraph wherein is also obtained a release action by which the wedge or spreading pressure on the friction elements is initially and immediately positively relieved upon discontinuance of the actuating force and prior to any relative movement of the friction elements, the latter being thereafter restored, during the remainder of the release action, to normal position under the influence of the spring resistance.

Other objects of the invention will more clearly appear from the description and claims hereinafter following.

Figure 8:
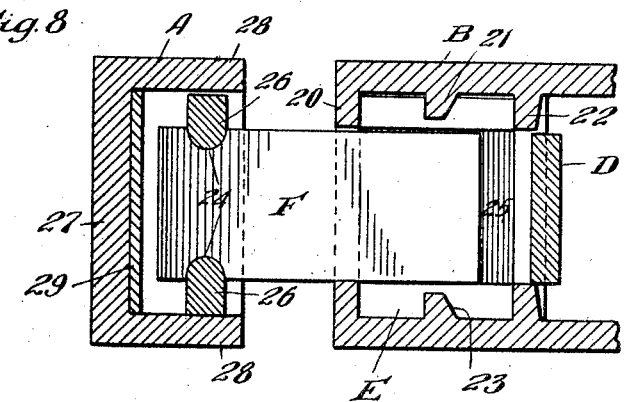
Figure 9:
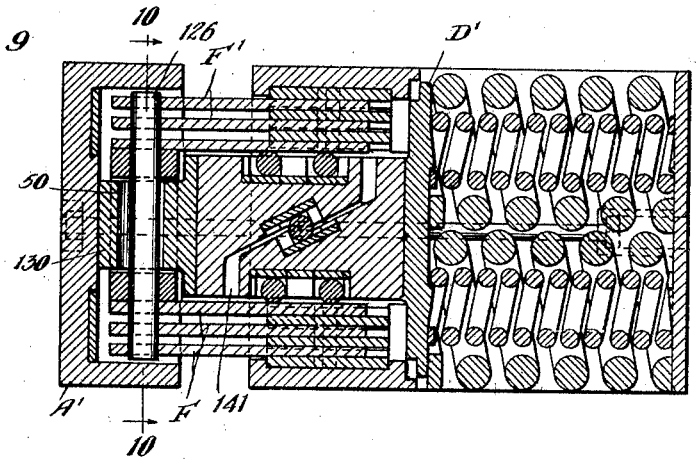
Figure 10:
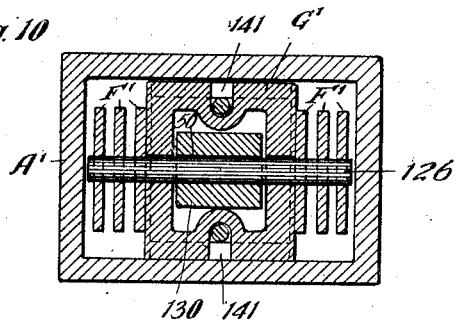

In the drawings forming a part of this specification, Figure 1 is a horizontal, longitudinal, sectional view of a portion of a railway draft rigging showing my improvements in connection therewith. Figures 2 and 3 are vertical, transverse, sectional views corresponding to the section lines 2—2 and 3—3 of Figure 1, respectively, Figure 3 being confined solely to the shock absorbing mechanism proper. Figure 4 is a vertical, longitudinal, sectional view of the shock absorbing mechanism proper corresponding substantially to the lines 4—4 of Figure 3. Figures 5, 6 and 7 are detail perspectives of a spring follower, a stationary friction element, and a movable friction element, respectively, employed in the mechanism. Figure 8 is a broken longitudinal vertical sectional view corresponding substantially to the line 8—8 of Figure 3. And Figures 9 and 10 are views corresponding respectively to Figures 1 and 3 of another embodiment of the invention, the section of Figure 10 being on the line 10—10 of Figure 9.

In said drawings and referring first to the construction illustrated in Figures 1 to 8 inclusive, 10—10 denote channel draft sills of a railway car to the inner faces of which are secured front stop lugs 11 and rear stop lugs 12. A portion of a drawbar is indicated at 13, the same being operatively associated with the shock absorbing mechanism proper by a hooded cast yoke 14 and coupler key 15. The yoke and shock absorbing mechanism therewithin are supported in operative position by a detachable saddle plate 16.

The shock absorbing mechanism proper, as shown, consists, broadly, of a front main follower A; a column-load-sustaining member B; twin arranged spring resistances C; a spring follower D; a series of relatively stationary friction plates E; a series of relatively movable friction plates F; a carrier G, to which the plates F are secured; a wedging system comprising two wedge elements H—H; an anti-friction roller K between the elements H—H; outer anti-friction elements L—L; and retainer bolts M—M.

The column-load-sustaining member B, in the form shown, is of box-like rectangular form at its forward or outer end and has upper and lower walls 17—17, side walls 18—18, and a rear wall 19, the latter being connected to the forward part of the member B by extending the upper and lower walls 17—17. With this construction the rear wall 19 is adapted to act as the rear follower of the mechanism in conjunction with the stop lugs 12. The member B is open at its sides so as to permit insertion and removal of the twin springs C—C.

At the outer or box-like casing end of the member B, the same is formed on the interior thereof on opposite sides of the center and on the inner faces of the top and bottom walls 17 with transversely extending ribs 20, 21 and 22 opposed to each other as best illustrated in Figure 8. The ribs 20, 21 and 22 define transversely extending channels or recesses within which are received the upper and lower edges of the relatively stationary friction plates E, the latter being notched as indicated at 23, to fit over the ribs 21. As will be evident from an inspection of Figure 8, the ribs 21 and 22 form tandem sets of shoulders to resist movement of the friction plates E inwardly of the member B. This construction is of importance for the reason that the plates E are subject to considerable longitudinally exerted forces and by duplicating the shoulders, the load is distributed to two sets of points on each plate E, thereby prolonging the life of the plates E as will be understood. The plates E are inserted within the member B at the center thereof and then shifted laterally between the ribs above mentioned and hence it will be seen that the plates E, while relatively immovable longitudinally with respect to the member B are, nevertheless, freely susceptible to pressure applied laterally or transversely of the friction surfaces of the plates E.

The plates F are of generally rectangular form and preferably cut from rolled strips and notched near their forward ends on each edge thereof as indicated at 24—24 in Figure 7. As shown in Figure 1, the plates F are alternated with the plates E and the latter are preferably formed with channel grooves 25 on one side thereof as shown in Figures 3 and 6 so as to provide guides for the plates F which are necessarily narrower than the plates E since the plates F are required to travel between the edges of the opposed ribs 20, 21 and 22 as shown in Figure 8. The thicknesses of the plates E and F and the depths of the channel grooves 25 are so proportioned as to insure the plates E being normally slightly spaced from each other as seen in Figure 3 and hence leave all the plates subject to laterally applied pressure. The plates E and F are arranged in two groups, one on each side of the center line as shown.

All of the plates F are secured to the carrier G which, as best shown in Figures 1 and 2, is provided at opposite ends thereof with a pair of upper and lower laterally extended arms 26—26 rounded on their opposed edges as shown in Figure 8 to correspond with the semi-circular notches 24 of the plates F. With this construction, it is evident that the plates F may be slipped lengthwise of the arms 26 and, while free to move lengthwise of the arms 26, are nevertheless held against movement in the direction of the length of the plates F with respect to the carrier G.

The inner ends of the plates F are normally disposed intermediate the front and rear edges of the plates E, as shown in Figure 1. The forward or outer ends of the plates F are extended beyond the end of the member B to a point within the follower A which is of cap-like form having a front wall 27 and a rearwardly extended rectangularly outlined flange 28. On the inner face of the wall 27 the follower A is provided with preferably case hardened steel inserts 29—29 opposite the adjacent ends of the plates F to thereby prevent gouging of the follower A when the latter comes in contact with the ends of the plates, as hereinafter described. In normal position of the parts, a small space is left between the inner face of the follower A and the adjacent ends of the plates F as shown in Figure 1, this distance, in actual practice, approximating a half inch. It will be noted that the follower A forms a housing or cap for the plates F and also that it is adapted to engage with the outer end of the member B, at the end of the compression stroke, to limit the action of the mechanism.

The follower A is provided at the center thereof with an inwardly extended, preferably integral block 30 which extends through a correspondingly shaped opening 31 in the center of the carrier G and engages the outer transverse face of the outer wedge element H. The transverse face of the inner wedge element H, as shown in Figure 1, engages the spring follower D. The two wedge elements H are preferably of like construction and each is formed on its outer longitudinally extending face with a recess in which is placed a hardened plate insert 32 forming a rolling bearing surface for the anti-friction means L which, in the instance shown, are in the form of two rollers for each element H. Suitable notches 33 are formed in each element H to limit the rolling movements of the rollers L but without interfering with their true rolling action for the amount necessary in operation of the mechanism. On each diagonal or true wedging face of each member H another recess is formed as indicated at 34, the bottom of which is covered by a hardened wear plate 35 forming a rolling bearing surface for the central common anti-friction roller K. Suitable shoulders 39 are formed on the members H to properly center the roller K and always leave it in an operative position.

From the preceding description it will be seen that the wedging system is adapted to be positively and directly actuated at its forward end from the front follower A and that it reacts at its inward end against the spring follower D. The two elements H—H are obviously so arranged that, upon application of longitudinal pressure, the two elements tend to more closely approach each other and thereby exert a lateral wedging or spreading action against the two groups of friction elements, it being observed that the innermost plate of each group is a so-called movable friction plate F. It will also be observed that not only are the two elements H of the wedging system anti-frictionally mounted with respect to each other but that both elements considered as an entirety or system are anti-frictionally mounted with respect to all of the friction-generating elements. In this manner I obtain a release which is instantaneous after removal of the actuating force and which has proven extremely efficient.

The follower D, as best shown in Figure 5, consists preferably of a transversely extending plate section 40 with which is adapted to engage the forward ends of both springs C on the one side and inner wedge element H on the other side. Preferably integrally formed with the plate section 40 are forwardly extended upper and lower horizontal spaced arms 41—41 which serve as pressure-transmitting columns or means between the follower D and the carrier G, the forward edges 42 of the arms 41 being in engagement with the carrier G in normal position of the parts. As best shown in Figure 3, the arms 41 straddle the wedging system.

The operation is as follows, assuming an inward or buffing movement of the drawbar. As the drawbar 13 moves inwardly, the follower A is forced in the same direction and during the first approximately half inch movement thereof, the wedging system will be forced rearwardly against the action of the springs C, during which initial approximately half inch movement, the wedging or spreading force against the friction elements is set up and the alternated or intercalated friction plates pressed laterally into tight frictional engagement with each other. As soon as the follower A has advanced said approximate half inch, it engages with the outer ends of the plates F and thereafter the latter move simultaneously with the follower A and the wedging system. This action continues until the end of the compression stroke which is determined by the follower A engaging the member B, it being understood that the latter is held stationary during the buffing stroke by means of the stop lugs 12. Upon removal or discontinuance of the actuating force from the drawbar 13, the springs C immediately react against the wedging system and the latter collapses due to the anti-friction means interposed between the parts thereof and between the system and all friction elements. During this initial portion of the release action, no movement of the plates F occurs, it being understood that the ends 42 of the arms 41 of the follower D will have been spaced from the carrier G during the compression stroke a distance corresponding to the initial movement of the wedging system with respect to the plates F. After such initial part of the release action wherein the wedging system has been collapsed and forced outwardly a short distance with respect to the plates F, the ends of the arms 41 of the follower D engage the carrier G and thereafter the plates F are pulled outwardly from their forward ends by the carrier G. From the preceding it will be seen that the pressure on the alternated friction elements is immediately relieved during the initial part of the release and prior to any movement imposed upon the plates F so that the outward restoration of the latter to normal position may be readily accomplished by the expansion of the springs C. The action of the mechanism under draft corresponds to that above described except that it is in an opposite direction.

Referring next to the construction illustrated in Figures 9 and 10, the arrangement is generally the same as that illustrated in the other figures, substantially the only difference being with respect to the attachment of the front ends of the movable plates and the description will be confined to such changes as are present. The movable friction plates designated F' are slotted near their outer or front ends to accommodate a transversely extending pin 126, said pin extending transversely through the rectangular yoke G'. No relative movement between the pin 126 and the carrier G' in a direction parallel to the axis of the mechanism is permitted. The carrier G' surrounds a pressure-transmitting block 130 which in this instance is formed separate from the follower A'. The pin 126 passes through an elongated slot 50 formed in the block 130, sufficient play being allowed to permit the wedging system and follower A' to move the desired amount relative to the plates F' before the latter are picked up and actuated as heretofore described, in connection with the other form of mechanism. In the construction of Figures 9 and 10, the spring follower D' has side arms 141 which engage the carrier G' and return the latter during the release action similar to the return of the carrier G heretofore described.

I have herein shown and described what I now consider the preferred manner of carrying out the invention but the same is merely illustrative and I contemplate all changes and modifications that come within the scope of the claims appended hereto.

I claim:

1. In a friction shock absorbing mechanism, the combination with a column-load-sustaining member; of a series of friction elements carried by said member and relatively immovable lengthwise thereof; a spring resistance; a series of relatively movable friction elements slidably mounted with respect to those of the first named series and cooperable therewith; a follower extending over the outer ends of said friction elements of the second named series and normally spaced a limited distance therefrom; combined wedge-pressure-transmitting means reacting at one end against said spring resistance and laterally against said friction elements to augment the friction therebetween; means for positively moving said wedge-pressure-transmitting means simultaneously with the movement of said follower; and means interposed between said spring resistance and the outer ends of said relatively movable friction elements arranged to pull the latter back to normal position during release.

2. In a friction shock absorbing mechanism, the combination with a column-load sustaining member; of a main follower movable relatively toward and from said member, said follower and member having opposed portions adapted to engage and limit the compression stroke of the mechanism; a series of friction elements carried by said member and held against movement relatively longitudinally thereof; a second series of friction elements cooperable with and slidable relatively to said friction elements of the first named series, the outer ends of the friction elements of said second series being normally spaced from said follower a limited distance; a spring resistance; combined wedge-pressure-transmitting means reacting at one end against said spring resistance and laterally against said friction elements to augment the friction therebetween, said wedge-pressure-transmitting means being positively actuated from and simultaneously with said follower; and means interposed between said spring resistance and said outer ends of said relatively movable friction elements arranged to pull the latter to normal position during release.

3. In a friction shock absorbing mechanism, the combination with a column-load-sustaining member; of a series of friction elements carried by said member and relatively immovable lengthwise thereof; a spring resistance; a series of relatively movable friction elements slidably mounted with respect to those of the first named series and cooperable therewith; a follower extending over the outer ends of said friction elements of the second named series, said follower being adapted to be actuated during the entire compression stroke; combined wedge-pressure-transmitting means reacting at one end against said spring resistance and laterally against said friction elements to augment the friction therebetween; means for positively moving said wedge-pressure-transmitting means simultaneously with the movement of said follower; means interposed between said spring resistance and the outer ends of said relatively movable friction elements arranged to pull the latter back to normal position during release; and anti-friction means interposed between said wedge-pressure-transmitting means and the friction elements.

4. In a friction shock absorbing mechanism, the combination with a column-load-sustaining member; of a series of friction elements carried by said member and relatively longitudinally immovable with respect thereto; a spring resistance; a series of relatively movable friction elements alternated with those of said first named series; a follower extending over the outer ends of said friction elements of the second named series and normally separated therefrom a limited distance; combined wedge-pressure-transmitting means including a plurality of wedge elements and anti-friction means between said elements adapting them for relative movement, said wedge-pressure-transmitting means reacting at one end against said spring resistance, laterally against said friction elements to augment the friction therebetween and at the front end being positively actuated by said follower; and means interposed between said spring resistance and the outer ends of said relatively movable friction elements arranged to pull the latter back to normal position during release.

5. In a friction shock absorbing mechanism, the combination with a column-load-sustaining member; of a series of friction elements carried by said member and relatively longitudinally immovable with respect thereto; a spring resistance; a series of relatively movable friction elements alternated with those of said first named series; a follower extending over the outer ends of said friction elements of the second named series, said follower being adapted to be actuated during the entire compression stroke; combined wedge-pressure-transmitting means including a plurality of wedge elements and anti-friction means between said elements adapting them for relative movement, said wedge-pressure-transmitting means reacting at one end against said spring resistance, laterally against said friction elements to augment the friction therebetween and at the front end being positively actuated by said follower; means interposed between said spring resistance and the outer ends of said relatively movable friction elements arranged to pull the latter back to normal position during release; and anti-friction means interposed between said wedge-pressure-transmitting means and the friction elements.

6. In a friction shock absorbing mechanism, the combination with a column-load-sustaining member; of a series of friction elements carried by said member and relatively immovable lengthwise thereof; a spring resistance; a series of relatively movable friction elements slidably mounted with respect to those of the first named series and cooperable therewith; a follower extending over the outer ends of said friction elements of the second named series and normally spaced a limited distance therefrom; combined wedge-pressure-transmitting means reacting at one end against said spring resistance and laterally against said friction elements to augment the friction therebetween; means for positively moving said wedge-pressure-transmitting means simultaneously with the movement of said follower; and means interposed between said spring resistance and the outer ends of said relatively movable friction elements arranged to pull the latter back to normal position during release, said means including a carrier to which the outer ends of said movable friction elements are secured, a spring follower, and pressure-transmitting means between said follower and said carrier.

7. In a friction shock absorbing mechanism, the combination with a column-load-sustaining member of hollow box-like form at one end; of a series of friction plates carried by said member and held against movement longitudinally thereof; a spring resistance; a series of relatively movable friction plates alternated with said stationary friction plates, said series of alternated plates being divided into two groups, one on each side of said member within the hollow box-like portion thereof; a main follower adjacent the outer ends of said movable friction plates but normally spaced a limited distance therefrom; combined wedge-pressure-transmitting means located between said two groups of plates, said means being directly acted upon by and simultaneously with said follower at one end and reacting at its other end against said spring resistance; and means interposed between said spring resistance and the outer ends of said relatively movable friction plates arranged to pull the latter outwardly from said member during release.

8. In a friction shock absorbing mechanism, the combination with two members relatively movable toward and from each other; of a series of friction plates carried by one of said members, said member having three sets of opposed transversely extending ribs spaced from each other longitudinally of said member, said plates being notched at the centers of their opposite side edges to conform to the intermediate set of said ribs, the front and rear edges of said plates engaging the end sets of said ribs whereby to provide double sets of shoulders for resisting relative movement of said plates with respect to said member; a series of relatively movable friction plates alternated with said first named plates; a spring resistance; and wedging means for augmenting the friction between said alternated plates during a compression stroke of the mechanism.

9. In a friction shock absorbing mechanism, the combination with a casing open at one end and adapted to cooperate with stop lugs at its other end; of a spring resistance mounted within said casing; a series of friction plates mounted in said casing and held against movement lengthwise thereof; a main follower of hollow cap-like form; a series of relatively movable friction plates alternated with said first named plates, the outer ends of said movable plates extending within the hollow portion of said cap-like follower but normally slightly spaced from the latter; a carrier disposed within said follower and to which the ends of said movable plates are attached, said carrier and follower being relatively movable lengthwise of the mechanism; wedge-pressure-transmitting means operative to effect a transverse pressure on said alternated friction plates; a pressure-transmitting block interposed between said follower and said wedge-pressure-transmitting means; a spring follower interposed between the inner end of said means and said spring resistance; and pressure-transmitting means extending between said spring follower and said carrier.

In witness that I claim the foregoing I have hereunto subscribed my name this 14th day of March, 1921.

JOHN F. O'CONNOR.

Witnesses:
CARRIE GAILING,
UNA C. PERIN.